(12) United States Patent
Mockenhaupt (10) Patent No.: US 11,773,978 B2
(45) Date of Patent: Oct. 3, 2023

(54) WIRE RING COMBUSTION SEAL FOR AUTOMOTIVE ENGINE

(71) Applicant: Dana Automotive Systems Group, LLC, Maumee, OH (US)

(72) Inventor: Martin Mockenhaupt, Buffalo Grove, IL (US)

(73) Assignee: Dana Automotive Systems Group, LLC, Maumee, OH (US)

(*) Notice: Subject to any disclaimer, the term of this patent is extended or adjusted under 35 U.S.C. 154(b) by 146 days.

(21) Appl. No.: 17/199,284

(22) Filed: Mar. 11, 2021

(65) Prior Publication Data

US 2022/0290759 A1  Sep. 15, 2022

(51) Int. Cl.
*F16J 15/12* (2006.01)

(52) U.S. Cl.
CPC .................. *F16J 15/122* (2013.01)

(58) Field of Classification Search
CPC .............. F16J 15/12; F16J 2015/0862; F16J 15/0818; F16J 15/122
See application file for complete search history.

(56) References Cited

U.S. PATENT DOCUMENTS 5,118,576 A * 6/1992 Imae .................. B32B 7/12
428/408
5,277,433 A * 1/1994 Ishikawa ............ F16J 15/123
277/593

(Continued)

FOREIGN PATENT DOCUMENTS

DE  202020105806 U1 * 12/2020 .......... F16J 15/0825
JP  09310761 A * 12/1997 .......... F16J 15/0825

(Continued)

OTHER PUBLICATIONS

"Metal Seal Design Guide—High Performance Engineered Seals and Sealing Systems," Parker Website, Available Online at https://www.parker.com/Literature/Seal%20Group/CSS%205129.pdf, Available Online as Early as Oct. 8, 2013, 106 pages.

*Primary Examiner* — Eugene G Byrd
(74) *Attorney, Agent, or Firm* — McCoy Russell LLP (57) ABSTRACT

A leak-proof sealing system is provided for sealing combustion chambers of an automotive engine. The system comprises a head gasket compressed between an engine block and a cylinder head, the head gasket comprising a gasket plate, a plurality of circular combustion apertures positioned on the gasket plate, the plurality of circular combustion apertures configured to register with a plurality of cylinder bore openings of the engine block, a plurality of bolt apertures distributed on the gasket plate, the plurality of bolt apertures alternating with the plurality of circular combustion apertures, and a plurality of wire rings, each wire ring extending circumferentially around a corresponding circular combustion aperture of the plurality of circular combustion apertures, where a surface of each wire ring includes a selective metal coating on sections of the wire ring spanning between two consecutive bolt apertures of the plurality of bolt apertures, and wherein sections of the wire ring located closer to the plurality of bolt apertures are devoid of metal coating. In one example, the system helps increase stress locally and reduces fatigue lift motion, thereby improving sealing and engine durability.

18 Claims, 6 Drawing Sheets

(56) References Cited

U.S. PATENT DOCUMENTS

| | | | |
|---|---|---|---|
| 5,277,434 A | 1/1994 | Kestly et al. | |
| 5,322,299 A * | 6/1994 | Terai | F16J 15/0818 |
| | | | 277/596 |
| 6,371,489 B1 * | 4/2002 | Combet | F16J 15/0825 |
| | | | 277/596 |
| 6,575,473 B2 | 6/2003 | Sugimoto et al. | |
| 7,204,491 B2 | 4/2007 | Hatamura et al. | |
| 7,360,768 B2 * | 4/2008 | Watanabe | F02F 11/002 |
| | | | 277/592 |
| 7,815,197 B2 * | 10/2010 | Ueta | F16J 15/0825 |
| | | | 277/593 |
| 9,476,382 B2 * | 10/2016 | Foster | F16J 15/0825 |
| 10,125,871 B2 * | 11/2018 | Yasuda | C21D 8/0247 |
| 10,989,303 B2 * | 4/2021 | Oohinata | C22C 38/38 |
| 2002/0093142 A1 | 7/2002 | Schmitt | F02F 11/002 |
| | | | 277/591 |
| 2005/0134006 A1 * | 6/2005 | Adams | F16J 15/0825 |
| | | | 277/601 |
| 2005/0134007 A1 * | 6/2005 | Kinoshita | F16J 15/0818 |
| | | | 277/628 |
| 2006/0091615 A1 * | 5/2006 | Udagawa | F02F 11/002 |
| | | | 277/594 |
| 2006/0175763 A1 * | 8/2006 | Duckek | F16J 15/0818 |
| | | | 277/593 |
| 2006/0273526 A1 * | 12/2006 | Fukai | F16J 15/0818 |
| | | | 277/591 |
| 2007/0228666 A1 * | 10/2007 | Schumacher | F16J 15/0825 |
| | | | 277/592 |
| 2010/0032909 A1 * | 2/2010 | Beyer | F16J 15/0818 |
| | | | 277/601 |
| 2011/0101626 A1 * | 5/2011 | Prehn | F16J 15/0825 |
| | | | 277/592 |
| 2012/0187638 A1 * | 7/2012 | Bauer | F16J 15/108 |
| | | | 264/261 |
| 2014/0042711 A1 * | 2/2014 | Foster | F02F 11/002 |
| | | | 277/594 |
| 2014/0117629 A1 | 5/2014 | Biallas et al. | |
| 2015/0069718 A1 * | 3/2015 | Haberer | F16J 15/0818 |
| | | | 277/593 |
| 2017/0152973 A1 * | 6/2017 | Kolb | F16L 25/026 |
| 2020/0263630 A1 * | 8/2020 | Yanagi | F02F 11/00 |

FOREIGN PATENT DOCUMENTS

| | | | | |
|---|---|---|---|---|
| JP | 2011017434 A | * | 1/2011 | ........... F16J 15/0825 |
| WO | 2005060516 A2 | | 7/2005 | |

* cited by examiner

WIRE RING COMBUSTION SEAL FOR AUTOMOTIVE ENGINE

TECHNICAL FIELD

The present disclosure relates generally to systems for sealing automotive engines.

BACKGROUND AND SUMMARY

In internal combustion engines subject to high loads, sealing between a cylinder head and an engine block is performed by a head gasket. The head gasket is often designed in such a way that it extends over all the cylinders. The engine block and the cylinder head are clamped together by means of a plurality of high-strength bolts distributed over the cylinders in order to reliably exert the required pressure on the head gasket. The head gasket, however, does not provide 100% sealing. Gasketed joints of the engine have difficulty sealing around areas immediately adjacent the combustion apertures, especially at the mid-span point between bolts. This can be attributed to wire rings of the head gasket which surround each cylinder aperture boundary and are made to have a uniform thickness. These weaker areas can cause leakage from the cylinders. Owing to high ignition pressures in the combustion chambers, the escaping gases may accumulate between the sealing surfaces causing damage to the sealing assembly or other engine components, e.g. crankcase. Therefore, an effective sealing system that may prevent leakage of combustion gases and improve engine durability is highly desirable.

A multi-layer cylinder head gasket is shown by Wiegert et al. in U.S. Pat. No. 6,676,134B1. Therein, a steel wire ring combustion seal extending circumferentially about each combustion aperture of the head gasket is described. The wire ring is disposed entirely within a flange and is configured to provide resistance against localized motion and bead cracking. Another multi-layer gasket employing sealing rings is shown by Gorman in WO 2005060516A2. Therein, the gasket comprising one or more circular openings is configured to register with cylinder bore openings of an engine. A sealing ring including a resilient core is secured to the gasket surrounding each of the circular opening.

However, the inventors herein have identified potential problems in the sealing systems such as those noted above. As one example, the wire rings of the cylinder head gaskets described by Wiegert et al. and Gorman have a uniform thickness throughout a circumference of the wire ring. Since the pressure exerted on a cylinder head gasket of an internal combustion engine varies with the location or distribution of the plurality of bolts over the cylinders, it creates two different compression zones on each wire ring combustion seal. A high compression zone is created in sections of the wire ring that are in close proximity to high-strength bolts. On the other hand, a low compression zone is created in those sections of the wire ring that are furthest from the bolts, typically in a mid-span region. Consequently, the high compression zones form stronger areas and the low compression zones form weaker areas of the sealing system. At the low compression zone, there is a resultant lower stress. Typically, this is the area a combustion seal will leak. A wire ring with a uniform thickness along its entire circumference cannot prevent leakage under these conditions.

The inventors herein have recognized the above issues, and others, and have developed a leak-proof sealing system for sealing combustion chambers of an automotive engine. The system comprises a head gasket compressed between an engine block and a cylinder head, the head gasket comprising a gasket plate, a plurality of circular combustion apertures positioned on the gasket plate, the plurality of circular combustion apertures configured to register with a plurality of cylinder bore openings of the engine block, a plurality of bolt apertures distributed on the gasket plate, the plurality of bolt apertures alternating with the plurality of circular combustion apertures, and a plurality of wire rings, each wire ring extending circumferentially around a corresponding circular combustion aperture of the plurality of circular combustion apertures, wherein a surface of each wire ring includes a selective metal coating on sections of the wire ring spanning between two consecutive bolt apertures of the plurality of bolt apertures, and wherein sections of the wire ring located closer to the plurality of bolt apertures are devoid of metal coating.

The sealing system, according to the present disclosure, is a head gasket comprising a plurality of wire ring combustion seal with wire rings of variable thicknesses. A surface of each wire ring within each combustion seal incudes a coating or deposition of metallic material, configured to increase stress locally in order to improve sealing at low compression zones. Each wire ring, extending circumferentially around a corresponding circular combustion aperture of the head gasket, is configured to be coated in a way such that only the sections of the wire ring that span between bolt apertures include metal deposition. The metal deposition may have a thickness range of 0.001-0.006 inches. The metal may be electroplated or chemically deposited to surfaces of the selective regions of the wire ring. As a non-limiting example, metals such as nickel, copper, aluminum, and nickel-Teflon may be utilized. However, coating materials may not be limited to these metals and other metals may be used for this purpose. The sections of each wire ring that are positioned in immediate proximity to the bolt apertures of the head gasket, and that come under the compression of a bolt are configured to be devoid of metal coating. Hence, each wire ring is configured such that uncoated sections of the wire ring alternate with the metal coated sections. This selective metal coating of wire rings of the head gasket creates wire rings of variable thickness that contribute greatly to improving the overall engine sealing system.

The sealing system of the present disclosure provides several advantages. For example, it improves sealing at weak stress areas by increasing stress locally. Selective plating of metal on surfaces of wire ring within each combustion seal not only increases load between bolt spans, but also increases load between cylinders, thereby preventing leakage from one cylinder to adjacent cylinders. Additionally, this system reduces fatigue lift motion and bore distortion. Metal deposition increases thickness of wire rings at selective regions, thereby increasing stiffness. This improves sealing by reducing motion and fatigue failure, thereby preventing leakage or cracking of beads of cylinder head gasket. Furthermore, the present system allows a reduction in wire ring diameter, which can improve engine durability by reducing hardware stresses.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1-5B are shown to scale, although other relative dimensions may be used if desired.

DETAILED DESCRIPTION

Figure 1:
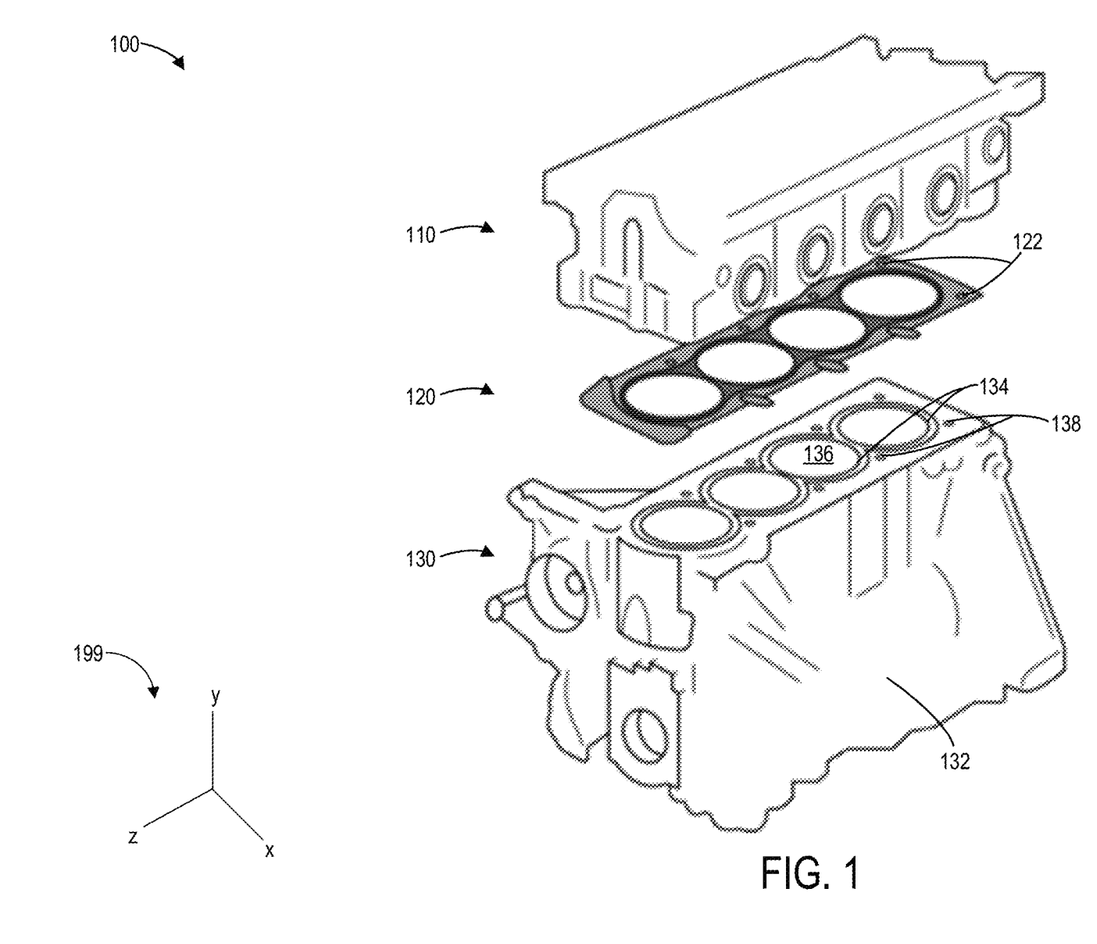
FIG. 1 shows an exploded view of a sealing assembly of an internal combustion engine, according to the present disclosure.
Figure 2:
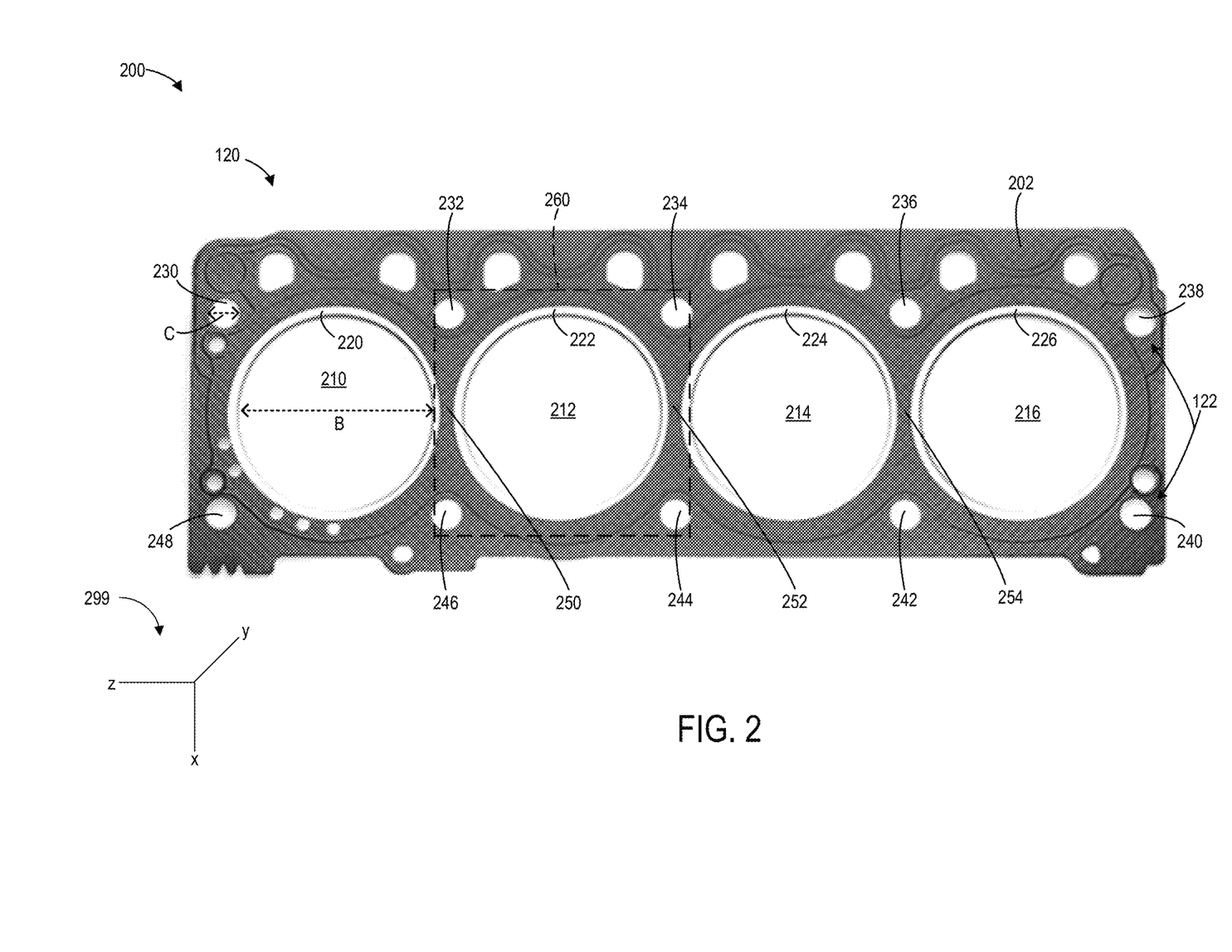
FIG. 2 shows a perspective view of a cylinder head gasket adapted to surround and seal a plurality of engine cylinder bore apertures.
Figure 4A:
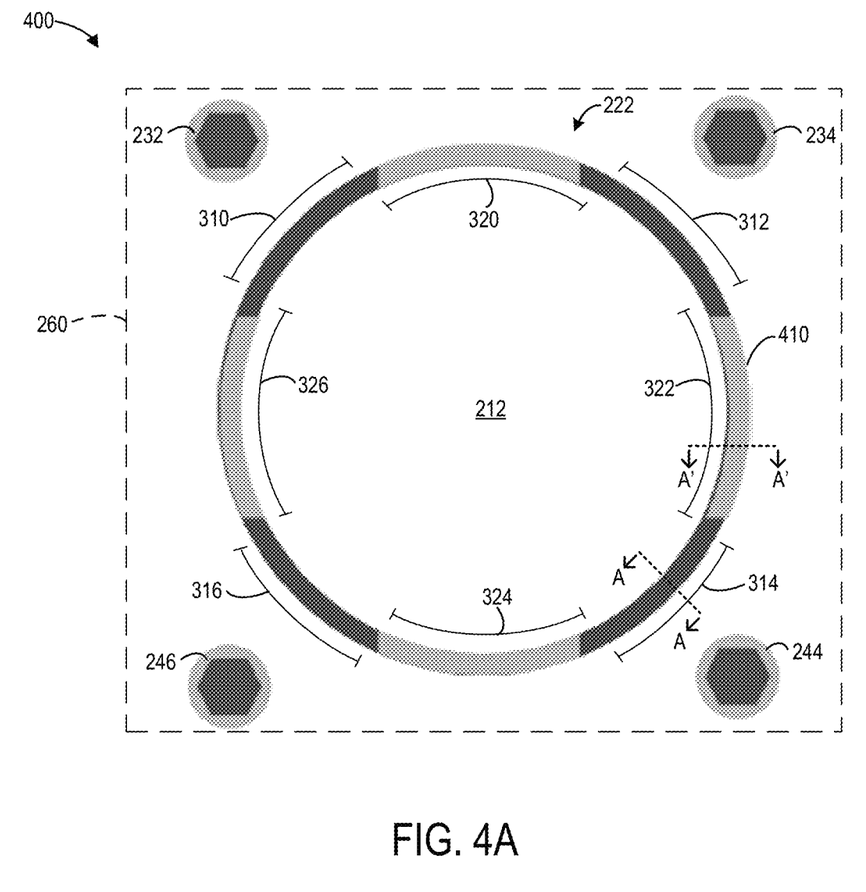
FIG. 4A shows an enlarged view of a wire ring in a combustion seal comprising metal deposition/coating on surfaces of selective sections of wire ring, in accordance with a first example of the present disclosure.

The following description relates to a sealing system for an automotive engine. The sealing system of the present disclosure is configured to seal weak stress areas by increasing stress locally. An exemplary sealing assembly of an internal combustion engine comprising a cylinder head, a head gasket and an engine block, according to the present disclosure, is shown in FIG. 1. FIG. 2 illustrates a perspective view of the head gasket compressed between the cylinder head and the engine block of the sealing assembly. The head gasket is adapted to surround and seal a plurality of engine cylinder bore apertures. An enlarged view of a wire ring combustion seal of the head gasket is provided in FIG. 3, indicating high compression zones and low compression zones. An example wire ring comprising metal deposition/coating on surfaces of selective sections is shown in FIG. 4A, in accordance with a first embodiment of the present disclosure. The wire ring is selectively coated with a metal such that metal coated sections of the wire ring alternate with uncoated sections. Cross-sectional views of the metal coated and uncoated sections of the wire ring of FIG. 4A are provided in FIG. 4B. Another example wire ring comprising a stepped profile of metal deposition/coating on surfaces of selective sections is shown in FIG. 5A, in accordance with a second embodiment of the present disclosure. Cross-sectional views of the metal coated and uncoated sections of the wire ring of FIG. 5A are provided in FIG. 5B. FIGS. 6A-6B represent graphically the concept of variable thickness of wire ring in a combustion seal, according to the present disclosure.

Referring to FIG. 1, FIG. 1 shows an exploded view of a sealing assembly 100 of an internal combustion engine. The sealing assembly 100 comprises a cylinder head 110, a head gasket 120 and an engine block 130. A coordinate axes 199 is provided for reference. The Y axis may be parallel to a gravitational axis. Further, the X axis may be a lateral or horizontal axis and the Z axis may be a longitudinal axis.

As shown in FIG. 1, the engine block 130 comprises a crankcase 132, a plurality of screw holes 138, and a plurality of cylinders 134. Each cylinder may be located within a respective cylinder bore aperture of the engine block 130. Additionally, each cylinder defines a combustion chamber 136. In some examples, a cylinder liner may line each combustion chamber. The head gasket 120 is arranged between the engine block 130 and the cylinder head 110. The cylinder head 110 is secured to the engine block 130 by means of a plurality of high-strength bolts (not shown), wherein the head gasket 120 is trapped between the cylinder head 110 and the engine block 130. The plurality of high-strength bolts extends from a plurality of bolt apertures 122 in the head gasket 120 to pass through both the plurality of screw holes 138 in the engine block 130 and a plurality of corresponding screw holes (not shown) in the cylinder head 110 to clamp the head gasket 120 between the engine block 130 and the cylinder head 110. As a result, the cylinder head 110, the engine block 130 and the head gasket 120 form a sealing region for sealing at least one combustion chamber of the plurality of combustion chambers of the engine block 130.

Referring to FIG. 2, a perspective view 200 of the head gasket 120 of the sealing assembly 100 of FIG. 1 is shown. As such, components previously introduced are numbered similarly in subsequent figures and are not reintroduced for brevity. The head gasket 120 may be aligned along the z-axis of reference axes 299.

As depicted in FIG. 2, the head gasket 120 comprises a gasket plate 202, a plurality of bolt apertures, a plurality of circular combustion apertures, and a plurality of wire rings. The gasket plate 202 is a thin rectangular-shaped structure adapted to surround and seal a plurality of engine cylinder bore apertures. In some examples, the gasket plate 202 may be composed of multiple layers of stainless steel.

The head gasket 120 has a plurality of circular combustion apertures that are large circular openings on the gasket plate 202, adapted to extend about the cylinders of an internal combustion engine in precise registration. In the illustrated example, four circular combustion apertures, a first circular combustion aperture 210, a second circular combustion aperture 212, a third circular combustion aperture 214, and a fourth circular combustion aperture 216 are shown to be arranged next to each other. A narrow region between any two consecutive circular combustion apertures is called a mid-span region. For example, a first mid-span region 250 is present between the first circular combustion aperture 210 and the second circular combustion aperture 212; a second mid-span region 252 is present between the second circular combustion aperture 212 and the third circular combustion aperture 214; and a third mid-span region 254 is present between the third circular combustion aperture 214 and the fourth circular combustion aperture 216.

The four circular combustion apertures of the head gasket 120 shown in FIG. 2 may be configured to extend about the respective cylinders of the plurality of cylinders 134 of the engine block 130 of FIG. 1. Each circular combustion aperture of the plurality of circular combustion apertures may have a diameter B. The diameter B of each circular combustion aperture may be similar to a diameter of each cylinder bore aperture of the engine block 130.

As shown in FIG. 2, the head gasket 120 further comprises a plurality of bolt apertures 122 positioned around the plurality of circular combustion apertures on the gasket plate 202. In the illustrated example, ten bolt apertures are shown. Five bolt apertures (a first bolt aperture 230, a second bolt aperture 232, a third bolt aperture 234, a fourth bolt aperture 236, and a fifth bolt aperture 238) are positioned on top of the plurality of circular combustion apertures. The rest of the five bolt apertures (a sixth bolt aperture 240, a seventh bolt aperture 242, an eighth bolt aperture 244, a ninth bolt aperture 246, and a tenth bolt aperture 248) are positioned on a bottom of the plurality of circular combustion apertures. Each bolt aperture of the plurality of bolt apertures 122 may have a diameter C. The diameter C of each bolt aperture is significantly smaller than the diameter B of each circular combustion aperture on the gasket plate 202. Each bolt aperture of the plurality of bolt apertures 122 allows a bolt (not shown) to pass through.

The head gasket 120 further comprises a plurality of wire ring combustion seals, each wire ring extending circumferentially around a respective circular combustion aperture of the gasket plate 202. For example, a first wire ring 220 extends circumferentially around the first circular combustion aperture 210. A second wire ring 222 extends circumferentially around the second circular combustion aperture 212. A third wire ring 224 extends circumferentially around the third circular combustion aperture 214. A fourth wire ring 226 extends circumferentially around the fourth circular combustion aperture 216. Each wire ring of the plurality of wire rings is made up of low carbon steel or stainless steel. Each wire ring is typically 1.5 mm thick; however, thickness of the wire ring may range from 0.8 mm to 2.5 mm. In some examples, each wire ring may be attached inside a metal flange. In other examples, however, the wire rings may be attached without a metal flange.

Figure 3:
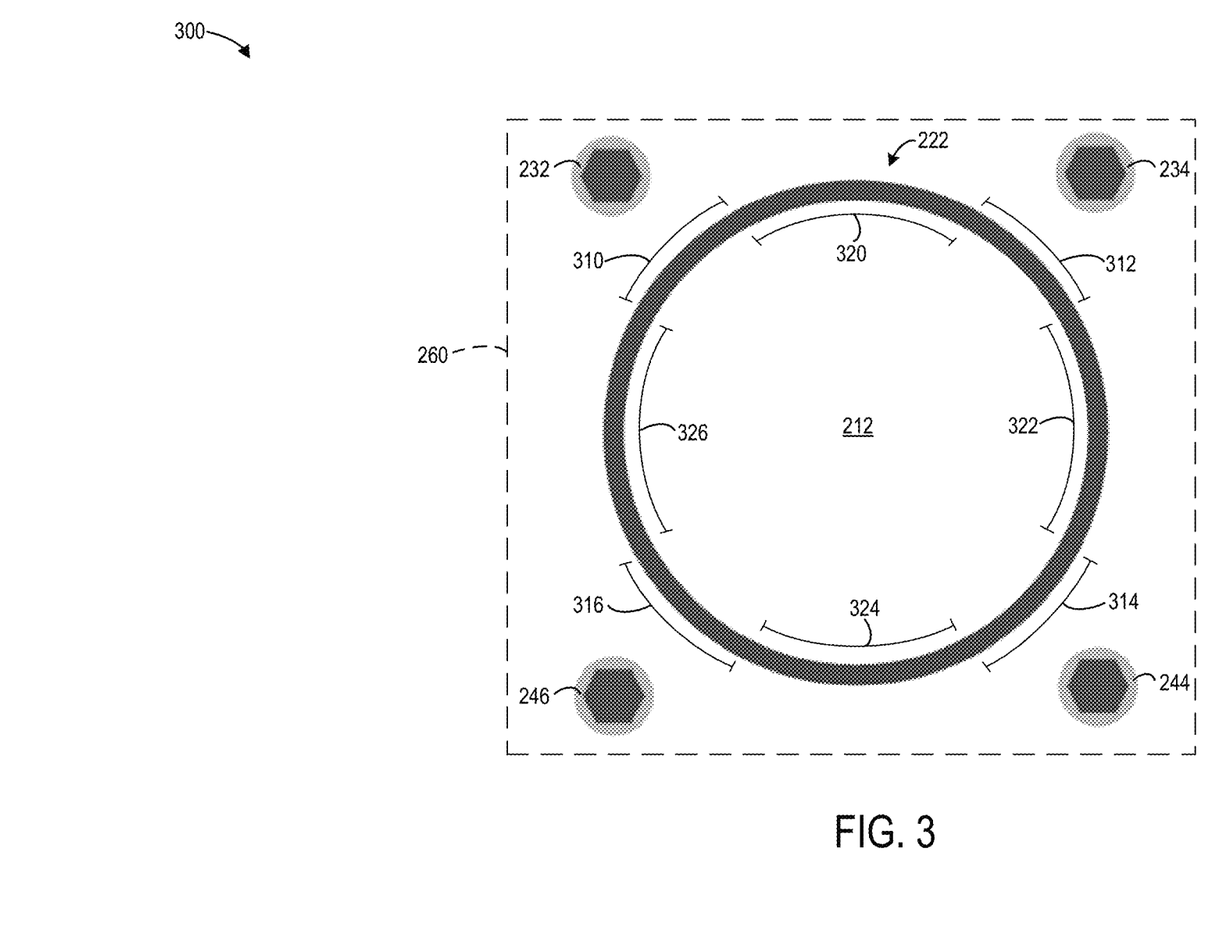
FIG. 3 shows an enlarged view of a wire ring combustion seal of the cylinder head gasket of FIG. 2, according to the present disclosure.

FIG. 3 shows an enlarged view 300 of a portion 260 of the head gasket 120 of FIG. 2. The portion 260 indicates a section of the gasket plate 202 comprising the second circular combustion aperture 212, along with the second wire ring 222 extending circumferentially around the second circular combustion aperture 212. The portion 260 also shows four bolt apertures of the plurality of bolt apertures 122 surrounding the second wire ring 222. The second bolt aperture 232 and the third bolt aperture 234 are located on top of the second wire ring 222 on either side of the wire ring. The eighth bolt aperture 244 and the ninth bolt aperture 246 are present on the bottom of the second wire ring 222 on either side of the wire ring. In the illustrated example, each of the second bolt aperture 232, the third bolt aperture 234, the eighth bolt aperture 244, and the ninth bolt aperture 246 incorporates a bolt.

As depicted in FIG. 3, the arrangement of the second wire ring 222 and the surrounding four bolt apertures are configured in a way such that some sections of the second wire ring 222 lie in immediate proximity to the bolt apertures, whereas other sections of the second wire ring 222 span between the bolt apertures. For example, a first section 310 of the second wire ring 222 lies in close proximity to the second bolt aperture 232; a third section 312 of the second wire ring 222 lies in close proximity to the third bolt aperture 234; a fifth section 314 of the second wire ring 222 lies in close proximity to the eighth bolt aperture 244; and a seventh section 316 of the second wire ring 222 lies in close proximity to the ninth bolt aperture 246. Interspaced between aforementioned sections in immediate proximity to the bolt apertures, a second section 320 of the second wire ring 222 is shown to span between the second bolt aperture 232 and the third bolt aperture 234; a fourth section 322 of the second wire ring 222 spans between the third bolt aperture 234 and the eighth bolt aperture 244; a sixth section 324 of the second wire ring 222 spans between the eighth bolt aperture 244 and the ninth bolt aperture 246; and an eighth section 326 of the second wire ring 222 spans between the ninth bolt aperture 246 and the second bolt aperture 232.

As shown in FIG. 3, a bolt passing through each of the second bolt aperture 232, the third bolt aperture 234, the eighth bolt aperture 244, and the ninth bolt aperture 246 creates areas of variable stress or compression on the gasket plate 202. An area surrounding a bolt aperture, when compressed by a bolt, creates a high compression zone. However, areas spanning between the bolts creates a relatively low compression zone. As for example, since the first section 310, the third section 312, the fifth section 314, and the seventh section 316 of the second wire ring 222 are in close proximity to a corresponding bolt/bolt aperture, these sections of the second wire ring 222 fall under the high compression zone, thereby preventing leakage of gases from respective cylinders. The second section 320, the fourth section 322, the sixth section 324, and the eighth section 326 of the second wire ring 222 spanning between the bolts/bolt apertures, fall under the low compression zone creating weaker stress areas with a potential to cause leakage.

Figure 4B:
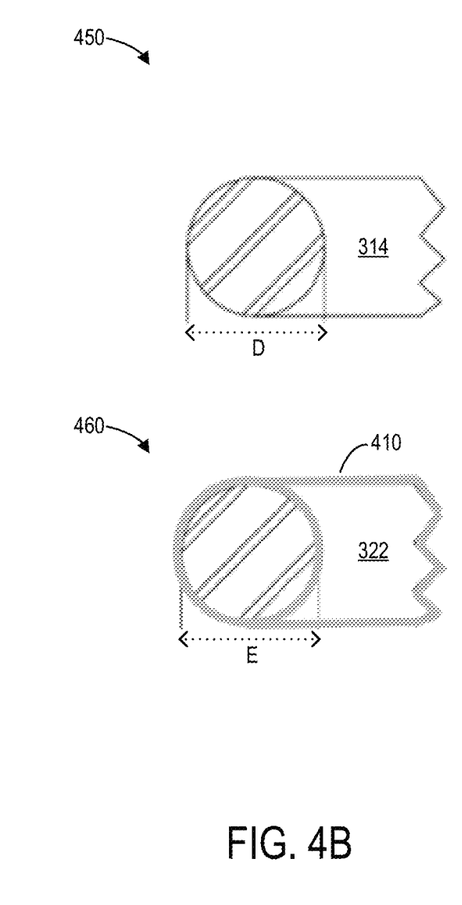
FIG. 4B shows cross-sectional views of the metal coated and uncoated sections of the wire ring of FIG. 4A.
Figure 5A:
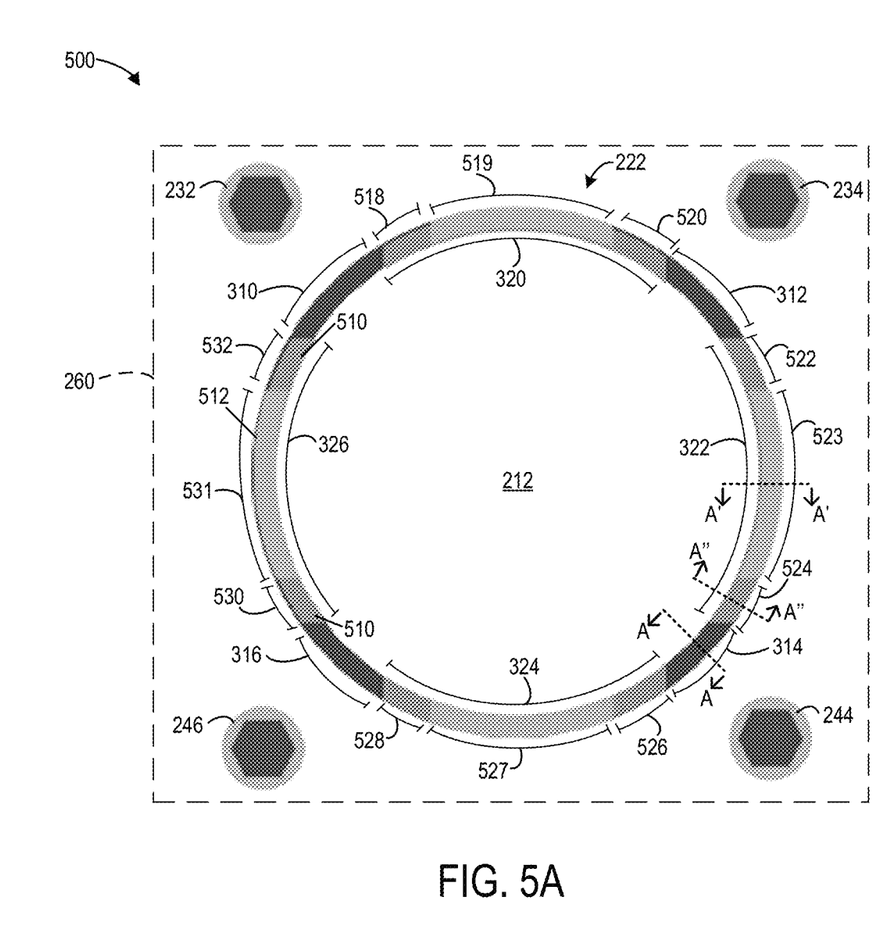
FIG. 5A shows an enlarged view of a wire ring in a combustion seal comprising a two-step metal deposition/coating on surfaces of selective sections of wire ring, in accordance with a second example of the present disclosure.

Turning to FIGS. 4A-4B, an enlarged view 400 of the portion 260 of the head gasket 120 of FIG. 2 is provided in FIG. 4A. The enlarged view 400 of the portion 260 includes the second circular combustion aperture 212, the second wire ring 222 extending circumferentially around the second circular combustion aperture 212, and four bolt apertures (the second bolt aperture 232, the third bolt aperture 234, the eighth bolt aperture 244, and the ninth bolt aperture 246) surrounding the second wire ring 222. In the illustrated example, each of the second bolt aperture 232, the third bolt aperture 234, the eighth bolt aperture 244, and the ninth bolt aperture 246 incorporates a bolt.

The second wire ring 222, shown in FIG. 4A, includes metal deposition or metal coating 410 on surfaces of selective sections, in accordance with a first embodiment of the present disclosure. FIG. 4B provides cross-sectional views 450 and 460 of uncoated and metal coated sections of the second wire ring 222, respectively, revealing the extent of metal coating, according to the first embodiment of the present disclosure. FIGS. 4A-4B are described herein collectively.

As depicted in FIG. 4A, each section of the second wire ring 222 spanning between the bolts/bolt apertures (i.e., the mid-span points), that fall under the low compression zone is coated with a metal on its surface. For example, the second section 320, the fourth section 322, the sixth section 324, and the eighth section 326 of the second wire ring 222 are coated with a metal of certain thickness. In the illustrated example, the metal coating 410 is 0.004 inches thick. In other examples, however, the metal coating 410 may have a thickness range of 0.001-0.006 inches. The coating thickness is chosen via computer simulation and verified in engine testing. The metal may be electroplated or chemically deposited to surfaces of these selective sections of the second wire ring 222. Some of the methods for selective plating of metal may include brush plating, masking, and reusable mold. In the illustrated example, the metal chosen for selective coating of wire ring is nickel, given its excellent strength and compatibility. In other examples, however, metals such as copper, aluminum, nickel-Teflon or other metals may be used for selective coating of wire rings of head gasket. This feature of metallic deposition on a selective surface of a wire ring increases load selectively at weaker stress areas, thereby providing better sealing.

As illustrated in FIG. 4A, the first section 310, the third section 312, the fifth section 314, and the seventh section 316 of the second wire ring 222 that are in close proximity to a corresponding bolt/bolt aperture and fall under the high compression zone are devoid of the metal coating. Therefore, in the illustrated example, the second wire ring 222 appears to have metal coated sections alternating with uncoated sections.

A cross-sectional view 450 of the example uncoated fifth section 314, as shown in FIG. 4B, is defined by an axial cut taken along a dashed line A-A of the second wire ring 222 of FIG. 4A. The cross-sectional view 450 of the example uncoated fifth section 314 shows no metal deposition on its surface. A similar lack of metal coating is present on each of the first section 310, the third section 312, and the seventh section 316 of the second wire ring 222. Additionally, a diameter of the cross-section of an uncoated section of the wire ring may be referred to as D. In the illustrated example, the diameter D of each of the uncoated section of the second wire ring 222 is 0.052 inches. A cross-sectional view 460 of the example metal coated fourth section 322, as shown in FIG. 4B, is defined by an axial cut taken along a dashed line A'-A' of the second wire ring 222 of FIG. 4A. The cross-sectional view 460 of the example metal coated fourth section 322 shows a metal deposition 410 of 0.004 inches' thickness on the surface. The metal coating has a single step that goes circumferentially around the entire circumference of the cross-section of the example metal coated fourth section 322 of the wire ring. Similar coating of metal is present on each of the second section 320, the sixth section 324, and the eighth section 326 of the second wire ring 222. Consequently, a diameter E of each of the metal coated section of the second wire ring 222 is 0.056 inches, in the illustrated example. This creates a wire ring of variable thickness and hence, a wire ring of variable stiffness.

The values provided above for the diameters D and E of the uncoated and metal coated sections, respectively, are exemplary in nature and may vary with other examples. As described previously, the metal coating 410 may have a thickness range of 0.001-0.006 inches. Therefore, the diameter of the metal coated sections of the wire ring may vary accordingly.

The illustrated example shows selective coating of only the second wire ring 222 of the head gasket 120. However, a similar selective coating may be applied to all the other wire rings (the first wire ring 220, the third wire ring 224, and the fourth wire ring 226) of the head gasket 120.

Figure 5B:
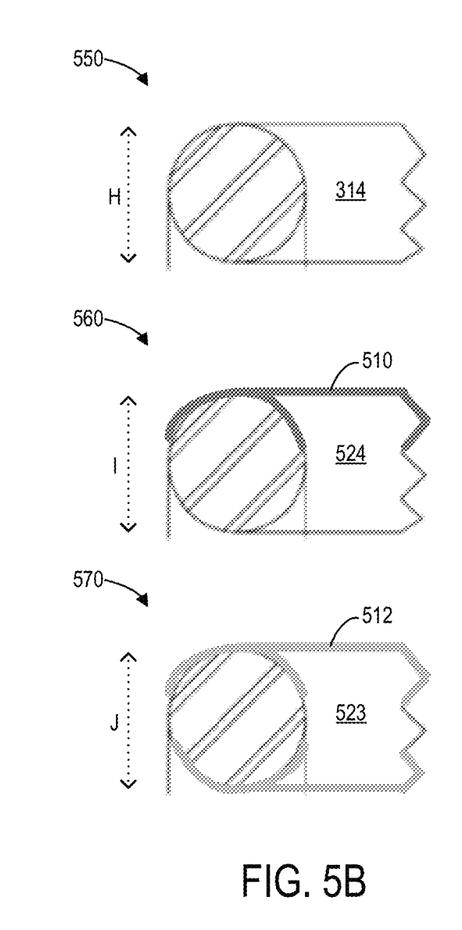
FIG. 5B shows cross-sectional views of the metal coated and uncoated sections of the wire ring of FIG. 5A.
Figure 6A:
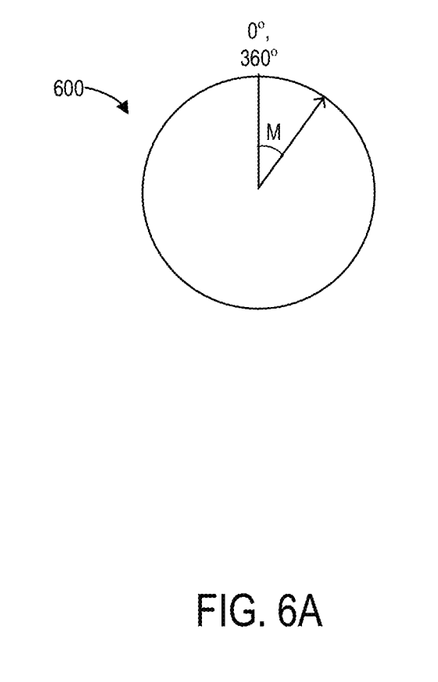
FIGS. 6A-6B show graphical representation of variable thickness of wire ring in a combustion seal, according to the present disclosure.
Figure 6B:
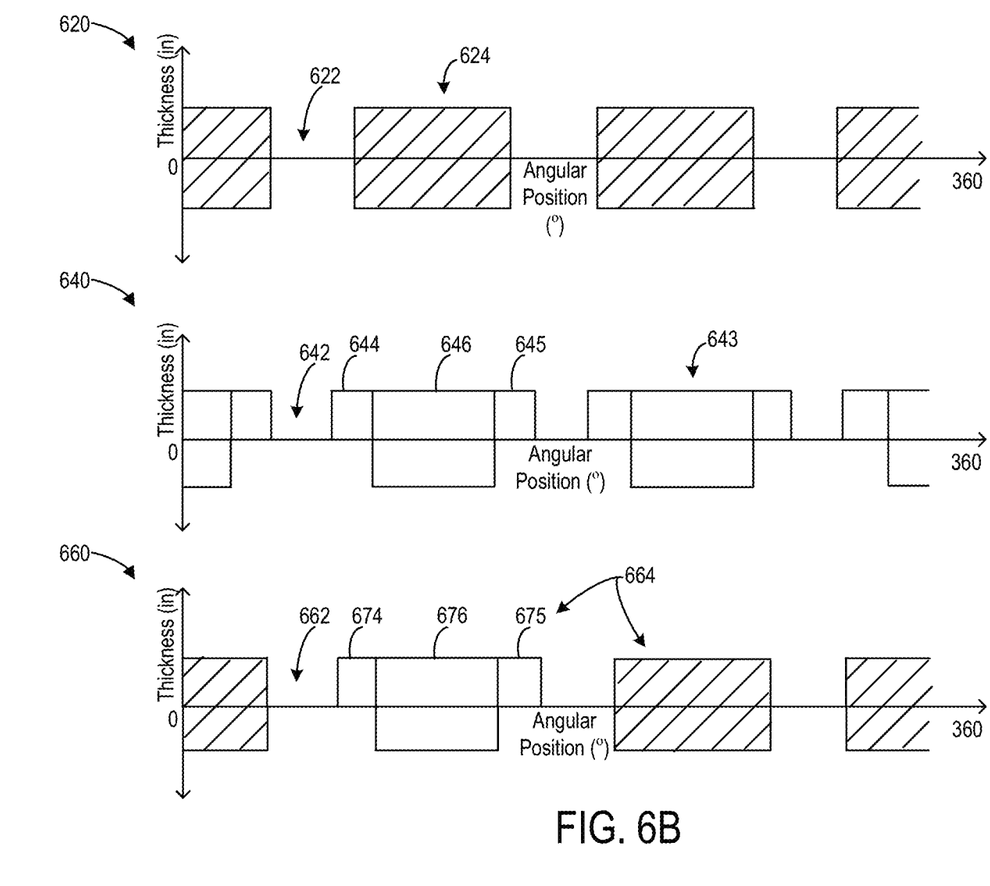

Turning to FIGS. 5A-5B, an enlarged view 500 of the portion 260 of the head gasket 120 of FIG. 2 is provided in FIG. 5A. The enlarged view 500 of the portion 260 includes the second circular combustion aperture 212, the second wire ring 222 extending circumferentially around the second circular combustion aperture 212, and four bolt apertures (the second bolt aperture 232, the third bolt aperture 234, the eighth bolt aperture 244, and the ninth bolt aperture 246) surrounding the second wire ring 222. In the illustrated example, each of the second bolt aperture 232, the third bolt aperture 234, the eighth bolt aperture 244, and the ninth bolt aperture 246 incorporates a bolt.

The second wire ring 222, shown in FIG. 5A, includes a two-step metal deposition on surfaces of selective sections, in accordance with a second embodiment of the present disclosure. FIG. 5B provides cross-sectional views 550, 560, and 570 of uncoated, single surface coated, and double surface coated regions of the second wire ring 222, respectively, revealing the extent of metal coating, according to the second embodiment of the present disclosure. FIGS. 5A-5B are described herein collectively.

As appreciated by FIG. 5A, each section of the second wire ring 222 spanning between the bolts/bolt apertures (i.e., the mid-span points), that fall under the low compression zone is coated with a metal on its surface. For example, the second section 320, the fourth section 322, the sixth section 324, and the eighth section 326 of the second wire ring 222 includes a metal coating of certain thickness. The thickness of the metal deposition in this embodiment is non-uniform. The metal coating in this embodiment comprises a two-stepped thickness. In other words, each metal coated section of the wire ring includes one or more regions with single surface coating and one or more regions with double surface coating, thereby creating variable thickness. Each of the one or more regions with single surface coating includes one surface (e.g., a top surface) that is metal coated and rest uncoated. Each of the one or more regions with double surface coating includes two surfaces (e.g., a top surface and a bottom surface) that are metal coated and rest uncoated.

In the illustrated example, each of the metal coated sections of the second wire ring 222 includes a middle region with double surface coating 512, and a first end region and a second end region each with single surface coating 510. For example, the metal coated second section 320 includes a first end region 518 and a second end region 520 with single surface coatings and a middle region 519 with double surface coating. The metal coated fourth section 322 includes a first end region 522 and a second end region 524 with single surface coatings and a middle region 523 with double surface coating. The metal coated sixth section 324 includes a first end region 526 and a second end region 528 with single surface coatings and a middle region 527 with double surface coating. The metal coated eighth section 326 includes a first end region 530 and a second end region 532 with single surface coatings and a middle region 531 with double surface coating.

The aforementioned computer-aided engineering (CAE) optimal thickness of metal coating on a surface of the wire ring may be reproduced by masking location. For example, regions of wire ring closer to a high compression zone may require only a single surface coating, while regions farther from a high compression zone may require a double surface coating. In the illustrated example, the metal deposition on a single surface coated region may have a thickness of 0.002 inches. Accordingly, the metal deposition on a double surface coated region may have a total thickness of 0.004 inches, with each surface having 0.002 inches' thick metal coating. In other examples, however, the metal coating may have a thickness range of 0.001-0.003 inches for single surface coating and correspondingly a thickness range of 0.002-0.006 inches for double surface coating. The optimal thickness of metal deposition on a surface of an example wire ring may be determined via finite element analysis (FEA) and verified via experimentation. The nature of a wire ring design may dictate the exact thickness of metal deposition; however, the thickness of double surface coating may be two times greater than the thickness of single surface coating. This creates a wire ring with a metal deposition having a two-stepped thickness. The single surface coating 510 in one region and the double surface coating 512 in another region of the wire ring form two steps of the metal deposition with varying thicknesses and hence, varying stiffness. The single surface coating 510 indicates a first step increase in thickness of a section of the wire ring and the double surface coating 512 indicates a second step increase in thickness of the section of the wire ring. A height of the second step metal deposition may be twice a height of the first step metal deposition, in some examples.

As described previously, the metal may be electroplated or chemically deposited to surfaces of these selective sections of the second wire ring 222. Some of the methods for selective plating of metal may include brush plating, masking, and reusable mold. In the illustrated example, the metal chosen for selective coating of wire ring is nickel, given its excellent strength and compatibility. In other examples, however, metals such as copper, aluminum, nickel-Teflon or other metals may be used for selective coating of wire rings of head gasket. This feature of metallic deposition on a selective surface of a wire ring increases load selectively at weak stress areas, thereby providing better sealing.

As illustrated in FIG. 5A, the first section 310, the third section 312, the fifth section 314, and the seventh section 316 of the second wire ring 222 that are in close proximity to a corresponding bolt/bolt aperture and fall under the high compression zone are devoid of the metal coating. Therefore, in the illustrated example, the second wire ring 222 appears to have metal coated sections alternating with uncoated sections.

A cross-sectional view 550 of the example uncoated fifth section 314, as shown in FIG. 5B, is defined by an axial cut taken along a dashed line A-A of the second wire ring 222 of FIG. 5A. The cross-sectional view 550 of the example uncoated fifth section 314 shows no metal deposition on its surface. Additionally, a height of the cross-section may be referred to as H. In the illustrated example, the height H of the uncoated sections of the second wire ring 222 is 0.052 inches.

A cross-sectional view 560 of the example single surface coated second end region 524 of the metal coated fourth section 322, as shown in FIG. 5B, is defined by an axial cut taken along a dashed line A"-A" of the second wire ring 222 of FIG. 5A. The cross-sectional view 560 of the example single surface coated region 524 shows a metal deposition 510 of 0.002 inches' thickness on a top surface, while rest of the surface is uncoated. Similar pattern of metal coating may be present on each of the single surface coated regions of the second wire ring 222. Consequently, a height I of each of the single surface coated region of the second wire ring 222 is 0.054 inches, in the illustrated example.

A cross-sectional view 570 of the example double surface coated middle region 523 of the metal coated fourth section 322, as shown in FIG. 5B, is defined by an axial cut taken along a dashed line A'-A' of the second wire ring 222 of FIG. 5A. The cross-sectional view 570 of the example double surface coated region 523 shows a metal deposition 512 of 0.002 inches' thickness on each of a top surface and a bottom surface, while a first side surface and a second side surface of the double surface coated region 523 remains uncoated. Similar pattern of metal coating may be present on each of the double surface coated regions of the second wire ring 222. Thus, the total thickness of metal deposition on a double surface coated region of the wire ring is 0.004 inches. Consequently, a height J of each of the double surface coated region of the second wire ring 222 is 0.056 inches, in the illustrated example. In some examples, the thickness of metal deposition on each of the top surface and the bottom surface of the double surface coated region of the wire ring may not be the same. As an example, CAE or engine testing may prove a thickness of 0.001 inches on the top surface and a thickness of 0.003 inches on the bottom surface of the wire ring are more robust, as opposed to 0.002 inches of metal deposition on each of the top and bottom surfaces shown in the illustrated example. Other example thicknesses of metal deposition are also possible in this case without departing from the scope this disclosure. Therefore, this creates a wire ring of variable thickness and hence, a wire ring of variable stiffness.

The values provided above for the heights H, I and J of the uncoated, single surface coated and double surface coated regions, respectively, are exemplary in nature and may vary with other examples. As described previously, the metal coating may have a thickness range of 0.001-0.003 inches for single surface coating and correspondingly a thickness range of 0.002-0.006 inches for double surface coating. Therefore, the height of the metal coated sections of the wire ring may vary accordingly.

While in the illustrated example above, the metal coating is discussed in relation to a top surface and/or a bottom surface of a selected section of the wire ring; it may be noted that in other examples the first step and second step of metal deposition may be applied to any suitable location on the surface of the selected section of the wire ring. This may include, but may not be limited to, top surface, first side surface, bottom surface or second side surface of the selected section of the wire ring, for example. As described previously, the appropriate location and thickness of metal coating on the surface of wire ring may be determined by computer simulation and verified in engine testing.

The illustrated example shows selective coating of only the second wire ring 222 of the head gasket 120. However, a similar selective two-step coating may be applied to all the other wire rings (the first wire ring 220, the third wire ring 224, and the fourth wire ring 226) of the head gasket 120.

While the metal deposition described in both the first embodiment (FIGS. 4A-4B) and the second embodiment (FIGS. 5A-5B) of the present disclosure improves the overall sealing assembly of an internal combustion engine, the two-step metal coating of the second example embodiment provides a more targeted metal deposition on a surface of a wire ring. The plating of metal on a wire ring surface at precise locations (e.g., a top surface, a bottom surface, or a side surface) not only increases stress locally but is also more cost efficient. By depositing metal partially and precisely on the surface of a particular section of the wire ring without coating the entire circumference of the cross-section may allow use of minimum amount of metal to achieve sealing function to prevent leakage from cylinders.

Turning now to FIGS. 6A-6B, FIGS. 6A-6B show graphical representation of variable thickness of a wire ring in a combustion seal, according to the present disclosure. FIGS. 6A-6B are described herein collectively. FIG. 6A depicts an example wire ring 600 indicating a 0° angular position through a 360° angular position, where the 0° angular position represents an initiation of the wire ring and the 360° angular position represents the complete wire ring. An arc length represented by an angle M corresponds to a section of the wire ring 600.

FIG. 6B shows three example plots, a first plot 620, a second plot 640, and a third plot 660, each depicting an unwrapped view of the wire ring 600 of FIG. 6A. The three example plots in FIG. 6B specifically show sections of the wire ring 600 with different types of metal coating, as described previously in accordance with the first and second embodiments of the present disclosure. In each of the first plot 620, the second plot 640, and the third plot 660, an abscissa denotes angular position (in degrees) of the wire ring 600 and an ordinate denotes thickness (in inches) of metal coating on a surface of the wire ring 600. Further, bars on the abscissa denote metal coated sections of the wire ring 600, while gaps between the bars on the abscissa denote uncoated sections of the wire ring 600.

The first plot 620 shows a plurality of uncoated sections 622 and a plurality of coated sections 624, where a thickness of the metal coating in each coated section is uniform. This plot may correspond to the metal deposition described previously with reference to FIGS. 4A-4B. The thickness of metal coating in each coated section of the plurality of coated sections 624 may range from 0.001-0.006 inches. Moving along the abscissa from 0° angular position to 360° angular position, each coated section and uncoated section of the wire ring may alternate with one another. The positive and negative thicknesses of metal coating (represented by the ordinate) of each coated section corresponds to metal coating on the top and bottom surfaces of the respective section of the wire ring. Additionally, shading of each coated section of the plurality of coated sections 624 indicates coating on an entire circumference of the cross-section, representing the uniformity of metal coating.

The second plot 640 shows a plurality of uncoated sections 642 and a plurality of coated sections 643. Moving along the abscissa from 0° angular position to 360° angular position, each coated section and uncoated section of the wire ring may alternate with one another. The pattern of metal coating in this plot may correspond to the two-stepped thickness of metal deposition described previously with reference to FIGS. 5A-5B. As shown in the second plot 640, each metal coated section further comprises regions of coating which does not cover the entire circumference of the cross-section. Each coated section of the plurality of coated sections 643 may include a first end region 644, a middle region 646, and a second end region 645. Each of the first end region 644 and the second end region 645 may have a single surface coating (e.g. on a top surface of the wire ring), as represented by the positive thickness of the ordinate. The middle region 646 may have a double surface coating (e.g., on a top surface and a bottom surface of the wire ring), as represented by the positive and negative thicknesses of the ordinate.

A third plot 660 shows an additional embodiment of variable metal deposition on a surface of a wire ring, representing a plurality of uncoated sections 662 and a plurality of coated sections 664. Moving along the abscissa from 0° angular position to 360° angular position, each coated section and uncoated section of the wire ring may alternate with one another. One or more of the coated sections of the plurality of coated sections 664, in the third plot 660, may show a two-stepped thickness of metal deposition similar to the plurality of coated sections 643 of the second plot 640. However, the rest of the coated sections of the plurality of coated sections 664, in the third plot 660, may show a uniform coating similar to the plurality of coated sections 624 of the first plot 620. The coated section with the two-stepped thickness, in the third plot 660, may further include a first end region 674, a middle region 676, and a second end region 675. Each of the first end region 674 and the second end region 675 may have a single surface coating (e.g. on a top surface of the wire ring), as represented by the positive thickness of the ordinate. The middle region 676 may have a double surface coating (e.g., on a top surface and a bottom surface of the wire ring), as represented by the positive and negative thicknesses of the ordinate. Each of the coated section, in the third plot 660, with uniform coating on an entire circumference of the cross-section is represented by shading as depicted.

In this way, the sealing system of the present disclosure contributes greatly to improving the overall sealing assembly of an internal combustion engine. The sealing system of the present disclosure provides several advantages. For example, it improves sealing at weaker stress areas by increasing stress locally. Deposition or plating of metal on selective surfaces of wire ring in a combustion seal not only increases load between bolt spans, but also increases load between cylinders, thereby preventing leakage from one cylinder to adjacent cylinders. Additionally, the present system reduces fatigue lift motion and bore distortion. Metal deposition increases thickness of wire rings at selective regions, thereby increasing stiffness. This improves sealing by reducing motion and fatigue failure, thereby preventing leakage or cracking of beads of cylinder head gasket. Furthermore, the present system allows a reduction in wire ring diameter, which can improve engine durability by reducing hardware stresses.

The disclosure provides support for a system for an engine, comprising a wire ring configured to extend circumferentially around a circular combustion aperture of a cylinder head gasket, the wire ring comprising a metal deposition on a surface of a plurality of selective sections, such that the sections of the wire ring located farther from a plurality of bolt apertures of the cylinder head gasket include the metal deposition. In a first example of the system, sections of the wire ring located closer to the plurality of bolt apertures of the cylinder head gasket are devoid of the metal deposition. In a second example of the system, optionally including the first example, the metal deposition has a thickness range of 0.001-0.006 inches. In a third example of the system, optionally including the first and second examples, the metal is deposited chemically or by electroplating. In a fourth example of the system, optionally including the first through third examples, the metal is chosen from a group of nickel, copper, aluminum, or nickel-Teflon. In a fifth example of the system, optionally including the first through fourth examples, the surface of each section of the wire ring lying at a mid-span point between any two consecutive bolt apertures of the plurality of bolt apertures of the cylinder head gasket includes the metal deposition. In a sixth example of the system, optionally including the first through fifth examples, the metal deposition on the surface of each section of the plurality of selective sections of the wire ring further comprises a two-stepped thickness, the two-stepped thickness including a double surface coating in a middle region and a single surface coating on each of a first end region and a second end region of each section of the plurality of selective sections of the wire ring. In a seventh example of the system, optionally including the first through sixth examples, the single surface coating has a thickness range of 0.001-0.003 inches and the double surface coating has a corresponding thickness range of 0.002-0.006 inches. In an eighth example of the system, optionally including the first through seventh examples, the wire ring is made up of low carbon steel or stainless steel.

The disclosure also provides support for a system for an internal combustion engine, comprising a gasket plate; a plurality of circular combustion apertures positioned on the gasket plate, the plurality of circular combustion apertures configured to register with a plurality of cylinder bore openings of the engine; a plurality of bolt apertures distributed on the gasket plate, the plurality of bolt apertures alternating with the plurality of circular combustion apertures; and a plurality of wire rings, each wire ring extending circumferentially around a corresponding circular combustion aperture of the plurality of circular combustion apertures, and where a surface of a plurality of selective sections of each wire ring lying at a mid-span point between two consecutive bolt apertures of the plurality of bolt apertures includes a metal deposition. In a first example of the system, sections of each wire ring located closer to the plurality of bolt apertures are devoid of the metal deposition. In a second example of the system, optionally including the first example, each bolt aperture of the plurality of bolt apertures allows a bolt to pass through to create a zone of high compression on the sections of each wire ring that are located closer to the bolt and a zone of low compression on the sections of each wire ring that are located farther from the bolt. In a third example of the system, optionally including the first and second examples, the wire ring is made up of low carbon steel or stainless steel. In a fourth example of the system, optionally including the first through third examples, the metal is deposited chemically or by electroplating. In a fifth example of the system, optionally including the first through fourth examples, the metal is chosen from a group of nickel, copper, aluminum, or nickel-Teflon. In a sixth example of the system, optionally including the first through fifth examples, the metal deposition on the surface of each section of the plurality of selective sections of each wire ring further comprises a two-stepped thickness, the two-stepped thickness including a double surface coating in a middle region and a single surface coating on each of a first end region and a second end region of each section of the plurality of selective sections of the wire ring. In a seventh example of the system, optionally including the first through sixth examples, the single surface coating has a thickness range of 0.001-0.003 inches and the double surface coating has a corresponding thickness range of 0.002-0.006 inches.

The disclosure also provides support for a sealing system for an automotive engine, comprising an engine block having a plurality of cylinder bore openings and a crankcase; a cylinder head positioned on the engine block; a head gasket compressed between the engine block and the cylinder head, the head gasket having: a gasket plate, a plurality of circular combustion apertures positioned on the gasket plate, the plurality of circular combustion apertures configured to register with the plurality of cylinder bore openings of the engine block, a plurality of bolt apertures distributed on the gasket plate, the plurality of bolt apertures alternating with the plurality of circular combustion apertures, and a plurality of wire rings, each wire ring extending circumferentially around a corresponding circular combustion aperture of the plurality of circular combustion apertures, wherein a surface of each wire ring includes a metal coating on sections of the wire ring spanning between two consecutive bolt apertures of the plurality of bolt apertures, and wherein sections of the wire ring located closer to the plurality of bolt apertures are devoid of the metal coating; and a plurality of bolts passing through the plurality of bolt apertures of the head gasket clamping the cylinder head, the head gasket and the engine block. In a first example of the system, each wire ring of the head gasket is configured to have a variable thickness along an entire circumference, and wherein uncoated sections of each wire ring alternate with the metal coated sections. In a second example of the system, optionally including the first example, the metal coating on the surface of at least one section of the multiple metal coated sections of each wire ring further comprises a two-stepped thickness, the two-stepped thickness including a double surface coating of a thickness range of 0.002-0.006 inches in a middle region and a single surface coating of a thickness range of 0.001-0.003 inches on each of a first end region and a second end region of the at least one section of the multiple metal coated sections.

FIGS. 1-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. Further, reference axes 199 and 299 are included in FIGS. 1-2 in order to compare the views and relative orientations described above. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in at least one example. FIGS. 1-5B are drawn approximately to scale, although other dimensions or relative dimensions may be used.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine, comprising:
a wire ring configured to extend circumferentially around a circular combustion aperture of a cylinder head gasket, a surface of the wire ring comprising a metal deposition on a plurality of selective sections, such that the sections of the wire ring located farther from a plurality of bolt apertures of the cylinder head gasket include the metal deposition,
wherein the metal deposition on the surface of at least one section of the plurality of selective sections of the wire ring further comprises a two-stepped thickness, the two-stepped thickness including a double surface coating in a middle region and a single surface coating on each of a first end region and a second end region of the at least one section of the plurality of selective sections of the wire ring.

2. The system of claim 1, wherein sections of the wire ring located closer to the plurality of bolt apertures of the cylinder head gasket are devoid of the metal deposition.

3. The system of claim 1, wherein the metal deposition has a thickness range of 0.001-0.006 inches.

4. The system of claim 3, wherein the metal is deposited chemically or by electroplating.

5. The system of claim 3, wherein the metal is chosen from a group of nickel, copper, aluminum, or nickel-Teflon.

6. The system of claim 1, wherein the surface of each section of the wire ring lying at a mid-span point between any two consecutive bolt apertures of the plurality of bolt apertures of the cylinder head gasket includes the metal deposition.

7. The system of claim 1, wherein the single surface coating has a thickness range of 0.001-0.003 inches and the double surface coating has a corresponding thickness range of 0.002-0.006 inches.

8. The system of claim 1, wherein the wire ring is made up of low carbon steel or stainless steel.

9. A system for an internal combustion engine, comprising:
a gasket plate;
a plurality of circular combustion apertures positioned on the gasket plate, the plurality of circular combustion apertures configured to register with a plurality of cylinder bore openings of the engine;
a plurality of bolt apertures distributed on the gasket plate, the plurality of bolt apertures alternating with the plurality of circular combustion apertures; and
a plurality of wire rings, each wire ring extending circumferentially around a corresponding circular combustion aperture of the plurality of circular combustion apertures, and wherein a surface of a plurality of selective sections of each wire ring lying at a mid-span point between two consecutive bolt apertures of the plurality of bolt apertures includes a metal deposition,
wherein the metal deposition on the surface of at least one section of the plurality of selective sections of each wire ring further comprises a two-stepped thickness, the two-stepped thickness including a double surface coating in a middle region and a single surface coating on each of a first end region and a second end region of the at least one section of the plurality of selective sections of the wire ring.

10. The system of claim 9, wherein sections of each wire ring located closer to the plurality of bolt apertures are devoid of the metal deposition.

11. The system of claim 9, wherein each bolt aperture of the plurality of bolt apertures allows a bolt to pass through to create a zone of high compression on the sections of each wire ring that are located closer to the bolt and a zone of low compression on the sections of each wire ring that are located farther from the bolt.

12. The system of claim 9, wherein the wire ring is made up of low carbon steel or stainless steel.

13. The system of claim 9, wherein the metal is deposited chemically or by electroplating.

14. The system of claim 13, wherein the metal is chosen from a group of nickel, copper, aluminum, or nickel-Teflon.

15. The system of claim 9, wherein the single surface coating has a thickness range of 0.001-0.003 inches and the double surface coating has a corresponding thickness range of 0.002-0.006 inches.

16. A sealing system for an automotive engine, comprising:
an engine block having a plurality of cylinder bore openings and a crankcase;
a cylinder head positioned on the engine block;
a head gasket compressed between the engine block and the cylinder head, the head gasket having:
a gasket plate;
a plurality of circular combustion apertures positioned on the gasket plate, the plurality of circular combustion apertures configured to register with the plurality of cylinder bore openings of the engine block;
a plurality of bolt apertures distributed on the gasket plate, the plurality of bolt apertures alternating with the plurality of circular combustion apertures; and
a plurality of wire rings, each wire ring extending circumferentially around a corresponding circular combustion aperture of the plurality of circular combustion apertures, wherein a surface of each wire ring includes a metal coating on sections of the wire ring spanning between two consecutive bolt apertures of the plurality of bolt apertures, and wherein sections of the wire ring located closer to the plurality of bolt apertures are devoid of the metal coating; and
a plurality of bolts passing through the plurality of bolt apertures of the head gasket clamping the cylinder head, the head gasket, and the engine block,
wherein the metal coating on the surface of at least one section of the multiple metal coated sections of each wire ring further comprises a two-stepped thickness, the two-stepped thickness including a double surface coating in a middle region and a single surface coating on each of a first end region and a second end region of the at least one section of the multiple metal coated sections.

17. The sealing system of claim 16, wherein each wire ring of the head gasket is configured to have a variable thickness along an entire circumference, and wherein uncoated sections of each wire ring alternate with the metal coated sections.

18. The sealing system of claim 17, wherein the double surface coating is of a thickness range of 0.002-0.006 inches in the middle region, and wherein the single surface coating is of a thickness range of 0.001-0.003 inches on each of the first end region and the second end region of the at least one section of the multiple metal coated sections.

* * * * *